United States Patent Office 2,746,897
Patented May 22, 1956

2,746,897

METHOD FOR THE MANUFACTURE OF CELLULOSE-REINFORCED RUBBER ARTICLES

Hugo Levin Röder, Arnhem, and Georg Hennemann, Velp, Netherlands, assignors to American Enka Corporation, Enka, N. C., a corporation of Delaware No Drawing. Application December 14, 1953,
Serial No. 398,216

Claims priority, application Netherlands January 19, 1953

21 Claims. (Cl. 154—136)

This invention relates to a new and improved method for the manufacture of vulcanized articles, such as automobile tires, conveyor belts and similar articles, from natural or synthetic rubber, said articles being reinforced with cord fabric plies of cellulosic material in the form of cord or similar thread form. The invention also relates to the new and improved composite articles made in accordance with the method.

The invention more particularly relates to the finishing or pre-treatment of the cellulose yarn which is embedded in the rubber mass prior to vulcanizing the whole, thereby producing the final composite article of greatly improved characteristics.

A finish suitable for such purposes must fulfill a number of requirements which are more demanding than is ordinarily required of a textile finish. The action thereof is not merely restricted to the ordinary textile processing of yarn, e. g. in cord formation, whereby it is to impart a certain smoothness to the yarn in the manner of the usual textile finish, although even from that point of view it may be said that rather high demands are made upon the finish. On the contrary, the effects of the finish to be employed in accordance with the present invention, and consequently therefore the demands made upon it, are greatly extended as to the entire manufacture of the composite product, and the applicability thereof depends upon the properties of, and imparted by, the finish.

Even during the pretreatment stage wherein the originally single yarn is to be converted into cord by various twisting procedures, a yarn of a certain mainimum degree of smoothness must be employed since the regularity of the twist is strongly affected by this smoothness. The greater the regularity of the twist, and hence of the cord thus formed, the more evenly distributed will be the load on the cord fabric during the useful life of the composite rubber product, and hence the longer will be that life.

A further and very important requirement placed upon the finish as a later component of the composite article of the type contemplated by the present invention is a high heat resistance, which indeed must at least be equal to that of the cellulose to which it is applied. In view of the high temperatures sometimes encountered e. g. in automobile tires during use, the finish must be such as will not develop decomposition products which may damage the other components of the tire or other composite rubber article, either mechanically or chemically.

It has already been proposed to treat (e. g. by dipping) cellulose products with certain agents such as polypeptides-containing compositions, dithiocyanate compounds and the like, in order to create a tight bond between the cellulose products and rubber. Those agents promote a close adhesion between the cellulose and the rubber. A suitable finish according to the present invention must not have any disadvantageous effect on the action of those dipping agents, but rather should promote their bonding action.

Finally, the finish must not be one that lowers the fatigue resistance of the cellulose component present in the tire or other composite rubber article.

A large number of finishing agents have been hitherto proposed for use on cellulosic yarns. However, as is well known, even for the textile industry proper only a very small percentage of such finishes has any real practical value, despite the fact that when compared with the problems encountered in connection with the present invention, only relatively moderate demands are made upon those known finishing agents. One essential difference is that such finishing agents, after having performed their function, may be and are removed from the textile product by washing with a suitable solvent. Factors such as heat resistance, effect on fatigue phenomena etc., need be given little consideration with ordinary finishes such as those and generally speaking, they are wholly unfit for use where relatively rigid requirements such as those involved in the present invention are encountered.

Ever since the art achieved success in preparing a smooth cellulose rayon, particularly viscose rayon, in a form suitable for automobile tire and conveyor belt cord, much attention has been devoted to the problem of finding a finish entirely satisfactory for treating cellulose products to be embedded in rubber. Heretofore, mixtures of white mineral oil and petroleum sulfonates or sulfonated vegetable oils have been used for the purpose. However, all such finishes fail in the environment of the present invention in that they do not meet one or more of the above mentioned relatively rigid requirements.

It is therefore an object of the present invention to provide a new and improved process for manufacturing composite vulcanized articles from rubber, either natural or synthetic, reinforced with cord fabric plies of cellulose, especially regenerated cellulose of the nature of viscose rayon.

It is a further object of the present invention to provide new and improved composite vulcanized articles of the kind just mentioned.

It is still another object of the invention to provide a new and improved method for the finishing or pretreatment of cellulose yarn, especially yarn of viscose rayon, which is to be embedded in the rubber prior to vulcanizing same to form the aforesaid composite articles.

The manner in which these and other objects of the invention are attained will become apparent from the following description of the invention, which is intended to be illustrative rather than limitative.

According to the present invention, it has been discovered that certain nitrogen compounds are eminently suitable for the above mentioned purposes. Especially suitable are those nitrogen compounds in which the nitrogen valencies are satisfied partly with strongly hydrophobic groups and partly with strongly hydrophilic groups.

More particularly, the present invention is based primarily upon the discovery that in manufacturing rubber articles such as automobile tires, conveyor belts and the like, which are reinforced with plies of cord fabric from cellulose products such as cellulose yarns or cellulose cords, particularly those of cotton or cellulose rayon such as viscose rayon, excellent results are obtained provided the cellulose component or product is first treated or impregnated with a finishing agent comprising a nitrogen compound in which a nitrogen atom is linked to a hydrophobic chain-shaped radical having more than 14 methylene groups, and at most having only a few other atom groups, and wherein the remaining valencies of said nitrogen atom are satisfied by ethoxy groups; the thus-treated cellulose product then being further treated in an otherwise conventional manner, including embedding same in a mass of rubber followed by vulcanizing the composite product.

Preferably, the finishing agent for the cellulosic product consists of a nitrogen-containing compound of the formula:

where $R_1$ is an acyl or an alkyl group with at least 15 —$CH_2$— groups, and $R_2$ and $R_3$ represent either a different or the same number of ethoxy groups, and together consist of at least 4 ethoxy groups.

Finishes of the foregoing type are satisfactory for manufacturing any type of composite rubber product from any kind of rubber and for treating the most diverse types of natural or synthetic cellulose products. Outstanding results, however, are obtained by the use of natural rubber, such as Hevea rubber, which is the most frequently employed for automobile tires, conveyor belts and similar products.

With increasing number of ethoxy groups per molecule in the finishing agent, the nitrogen compounds contemplated herein become fairly soluble in water.

The nitrogen compounds contemplated herein have a high decomposition temperature so that there is no danger of the development of gases and vapors which could be detrimental to the other components of the composite product by mechanically loosening the structure or by chemical attack.

The long-chain radical with the plurality of methylene groups, $R_1$, appears to enable the finishing agent to impart to the desired extent the required fatty and smooth, i. e., friction-reducing, property to the cellulose product, whereas the other radicals comprising the plurality of ethoxy groups, $R_2$ and $R_3$, counteract, in this respect, the first mentioned radical. Owing to the local difference in the two opposite types of these radicals, their actions, however, are by no means compensated. At any rate, the remarkable double character of the nitrogen compounds in question (viz, characterized on the one hand by the paraffin-like hydrophobic moiety resulting from the plurality of methylene groups and on the other hand by the hydrophilic moiety resulting from the plurality of ethoxy groups) apparently renders these finishing agents particularly suitable for effecting an exceedingly tight bond between the hydrophobic rubber and hydrophilic cellulose.

Furthermore, it has been found that with a particular molecular configuration of these nitrogen compounds unusually good results were obtainable in certain cases. Thus, these nitrogen compounds have been found to be especially effective when the methylene groups of the radical $R_1$ are connected with each other in a chain-like manner, and the number of methylene groups is over 14 and preferably 16, 18 or 19.

The suitability of the nitrogen compounds depends somewhat upon the ratio between the hydrophobic, methylene groups-containing component and hydrophilic ethoxy groups-containing component of the molecule.

According to a particularly desirable embodiment of the invention, a finish is employed consisting essentially of a nitrogen compound of amine character having the following structural formula:

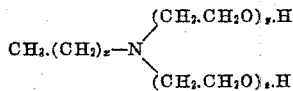

where $x=15$ to 19, and $y+z=4$ to 10.

Furthermore, it has been found that the paraffin chain (i. e., the plurality of methylene groups) may also be replaced by the acid radical of a higher organic acid, among which the radicals of palmitic, stearic and arachidic acids have been found to be very suitable, the resulting compounds constituting polyethoxylated amides of those higher organic acids.

Thus, according to another particular embodiment of the invention, finishes are employed having the following structure:

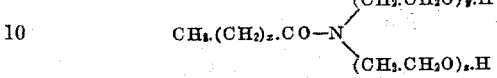

where $x=14$ to 18, especially 16, and $y+z=6$ to 8.

The hydrophobic radical, $R_1$, consists preferably of an unbranched paraffin hydrocarbon chain and it is not recommended to have present numerous atoms or atom groups other than methylene groups. Under certain circumstances, however, a few other atoms or atom groups, such as N, S, O, HO, and CO, ring groups and double bonds, may be present is desired.

The nitrogen compounds employed according to the present invention do not show a very high adsorptive power with respect to cellulose when the cellulose is treated with an aqueous solution of the compounds, and for this reason the finish is readily and uniformly distributed on the cellulose product.

According to the present invention, it is sufficient to employ relatively small amounts of finishing agent. Thus, as little as 0.2 to 0.4% by weight, based on the dry cellulose, is found to give good results.

It will be understood that after the treatment of the cellulose with the nitrogen-containing finishing agent according to the present invention, the treated cellulose is embedded in a mass of rubber to form the described composite rubber article, and the whole is then vulcanized in accordance with otherwise conventional practice.

While the specific examples of preferred methods and compounds embodying the present invention have been described above, it will be apparent that many changes and modifications may be made therein without departing from the spirit of the invention. It will be understood therefore that the particular methods of procedure and compounds recited above are intended to be illustrative only and are not intended to limit the invention.

What is claimed is:

1. In a method for the manufacture of composite rubber articles which are reinforced with plies of cord fabric made from cellulose products in which the cellulose product is treated with a finishing agent, is thereafter embedded in a mass of rubber, and the composite mass is then vulcanized to form the desired rubber article, the improved step of employing as the finishing agent a nitrogen compound having a high decomposition temperature in which one nitrogen valence is satisfied by a hydrophobic, chain-shaped radical containing more than 14 methylene groups and the other valencies of the nitrogen compound are satisfied by at least four ethoxy groups.

2. A method as defined in claim 1 in which the nitrogen compound has the formula:

wherein $R_1$ is a radical selected from the class consisting of acyl and alkyl groups having at least 15 methylene groups and $R_2$ and $R_3$ are ethoxy groups, the ethoxy groups together totaling at least 4.

3. A method as defined in claim 2 in which the rubber articles are made from natural rubber.

4. A method as defined in claim 2 in which the radical $R_1$ has more than 14 methylene groups but no more than a total of 20 carbon atoms.

5. A method as defined in claim 2 in which the nitrogen compound has the formula:

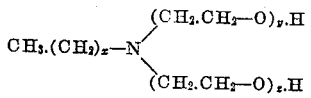

where $x=15$ to $19$, and $y+z=4$ to $10$.

6. A method as defined in claim 2 in which the nitrogen compound has the formula:

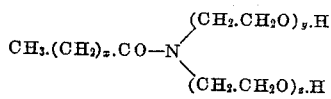

where $x=14$, $16$ or $18$, and $y+z=4$ to $10$.

7. A method as defined in claim 2 in which the nitrogen compound has the formula:

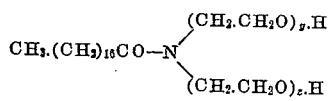

where $y+z=6$ to $8$.

8. A method as defined in claim 1 in which the finishing agent is employed to the extent of about 0.2 to 0.4% by weight of the dry celulose product.

9. A method as defined in claim 2 in which the finishing agent is employed to the extent of about 0.2 to 0.4% by weight of the dry cellulose product.

10. A method as defined in claim 3 in which the finishing agent is employed to the extent of about 0.2 to 0.4% by weight of the dry cellulose product.

11. A method as defined in claim 4 in which the finishing agent is employed to the extent of about 0.2 to 0.4% by weight of the dry cellulose product.

12. A method as defined in claim 5 in which the finishing agent is employed to the extent of about 0.2 to 0.4% by weight of the dry cellulose product.

13. A method as defined in claim 6 in which the finishing agent is employed to the extent of about 0.2 to 0.4% by weight of the dry cellulose product.

14. A method as defined in claim 7 in which the finishing agent is employed to the extent of about 0.2 to 0.4% by weight of the dry cellulose product.

15. A composite vulcanized cellulose-reinforced rubber article prepared as defined in claim 1.

16. A composite vulcanized cellulose-reinforced rubber article prepared as defined in claim 2.

17. A composite vulcanized cellulose-reinforced rubber article prepared as defined in claim 3.

18. A composite vulcanized cellulose-reinforced rubber article prepared as defined in claim 4.

19. A composite vulcanized cellulose-reinforced rubber article prepared as defined in claim 5.

20. A composite vulcanized cellulose-reinforced rubber article prepared as defined in claim 6.

21. A composite vulcanized cellulose-reinforced rubber article prepared as defined in claim 7.

References Cited in the file of this patent

UNITED STATES PATENTS

| | | |
|---|---|---|
| 1,973,860 | Ulrich et al. | Sept. 18, 1934 |
| 2,047,066 | Glietenberg | July 7, 1936 |
| 2,047,069 | Hentrich et al. | July 7, 1936 |
| 2,211,949 | Hershberger | Aug. 20, 1940 |
| 2,286,793 | Dickey | June 16, 1942 |
| 2,314,998 | Lessig et al. | Mar. 30, 1943 |
| 2,318,120 | Whitehead | May 4, 1943 |
| 2,671,042 | Stokes | Mar. 2, 1954 |